United States Patent
Koebe et al.

(10) Patent No.: US 6,993,449 B2
(45) Date of Patent: Jan. 31, 2006

(54) TIRE PRESSURE LOSS DETECTION

(75) Inventors: Andreas Koebe, Bensheim (DE); Yongle Lou, Shelby Township, MI (US); Peter Olejnik, Rosbach (DE); Ines Runge, Hannover (DE)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/769,215

(22) Filed: Jan. 31, 2004

(65) Prior Publication Data

US 2005/0171723 A1 Aug. 4, 2005

(51) Int. Cl.
- B60C 23/00 (2006.01)
- G06F 7/00 (2006.01)
- E01C 23/00 (2006.01)

(52) U.S. Cl. .......................... 702/138; 73/146; 701/29; 303/163; 340/443; 340/444

(58) Field of Classification Search ................. 702/98, 702/127, 138, 104; 73/146, 146.2, 146.5, 73/147; 340/442–444, 447; 701/1, 29, 93
See application file for complete search history.

(56) References Cited

U.S. PATENT DOCUMENTS

| | | | |
|---|---|---|---|
| 4,574,267 A * | 3/1986 | Jones ........................ 340/443 |
| 5,541,573 A * | 7/1996 | Jones ........................ 340/444 |
| 5,588,721 A * | 12/1996 | Asano et al. ............... 303/163 |
| 5,712,616 A | 1/1998 | Schmitt et al. ............. 340/442 |
| 6,374,163 B1 | 4/2002 | Lou et al. ....................... 701/1 |
| 6,385,553 B1 | 5/2002 | Naito et al. ................. 702/138 |
| 6,450,020 B1 | 9/2002 | Naito et al. ................. 73/146.2 |
| 6,510,375 B2 | 1/2003 | Faye ............................ 701/93 |
| 6,550,320 B1 * | 4/2003 | Giustino ...................... 73/146 |
| 6,725,136 B2 * | 4/2004 | Lutz et al. .................... 701/29 |

FOREIGN PATENT DOCUMENTS

| | | |
|---|---|---|
| EP | 0 695 653 | 10/1997 |
| EP | 0 578 826 | 7/1998 |
| WO | WO 01/87647 | 11/2001 |

* cited by examiner

Primary Examiner—Bryan Bui
Assistant Examiner—John Le
(74) Attorney, Agent, or Firm—Brinks Hofer Gilson & Lione (57) ABSTRACT

The present invention is directed to monitoring the loss of pressure in one or more tires by detecting the angular speed variations of one or more wheels of the vehicle over a specified wheel revolution period and analyzing the vibration of the speed various. Changes in the frequency are related to pressure loss, which is indicated to the driver, for example, by displaying the tire pressure loss information on a display.

14 Claims, 6 Drawing Sheets

TIRE PRESSURE LOSS DETECTION

BACKGROUND

The present invention relates to air pressure loss detection in one or more tires of a vehicle.

During the operation of a vehicle, significant loss of pressure in one or more tires may cause the driver to lose control of the vehicle or a tire failure. Moreover, event slight pressure losses in a tire can result in reduced service life for that tire. Therefore, it is desirable to be able to inform the driver that one or more tires are losing pressure, especially before hazardous conditions are reached.

Certain systems measure the pressure of each tire directly and relay this information to the driver. Other systems measure changes in the effective rolling diameter of the tires caused by losses in pressure or its response to road induced vibration. Yet in other systems the rotational velocities of the tires are measured under certain operating situations to identify conditions of the tires. For instance, loss of air in a tire may cause an increase in rotational resistance of the tire, and hence a perceptible change in the tire rotational velocity.

BRIEF SUMMARY OF THE INVENTION

As a vehicle maneuvers over a road surface, ground excitation generates angular speed variations or torsional vibration of one or more wheels of the vehicle caused by for-aft displacements of the wheels. The frequency of the speed variations depends on the tire sidewall stiffness, which is mainly influenced by the tire pressure. The angular speed variation of a wheel shifts from a higher frequency to a lower frequency at a given speed when there is tire pressure loss.

In accordance with the invention, the loss of pressure in one or more tires is monitored by detecting the angular speed variations of one or more wheels of the vehicle and analyzing the frequency of the speed variations over a specified wheel revolution period. Changes in the frequency are related to pressure loss in one or more tires, which is indicated to the driver, for example, by displaying the tire pressure loss information on a display.

Other features and advantages will be apparent from the following drawings, detailed description, and claims.

DETAILED DESCRIPTION

The following terminology is helpful for understanding various aspects of the present invention:

FFT—Fast Fourier Transform

DFFT—Discrete Finite Fourier Transform $\Theta$—A finite period of angle (as a multiple of $2\pi$ radian) for estimating the Fourier transform N—A finite number of sampled points for estimating the DFFT $\theta_n$—Angle of the $n_{th}$ signal sampled $\Delta\theta$—Angle interval between two consecutive samples, $$\left(\text{i.e. } \Delta\theta = \frac{\Theta}{N} \ (2\pi \text{ radian})\right)$$

$\Delta t_n$—A period of time during the $n_{th}$ rotation of $\Delta\theta$ $r(\theta)$—A signal sampled in the angle $\theta = n\Delta\theta$ (i.e. the time period between two encoder flanks of rising edges or down edges; $r(\theta) = r(n\Delta\theta) = \Delta t_n$)

M—Number of frequencies detected in a frequency spectrum $\Delta\Omega$—Angular frequency resolution in the angular domain that is equal to the difference between consecutive frequencies (cycles/$2\pi$ radian)

$\Omega$—Angular frequency (cycles/$2\pi$ radian) defined in the angular spectrum $\Omega = m\Delta\Omega$ m=0,1,2,3, ..., M–1

$\omega$—Angular velocity of an axle ($2\pi$ radian/sec)

$\Delta f$—Frequency resolution in the time domain or difference between consecutive frequencies (Hz)

Figure 2:
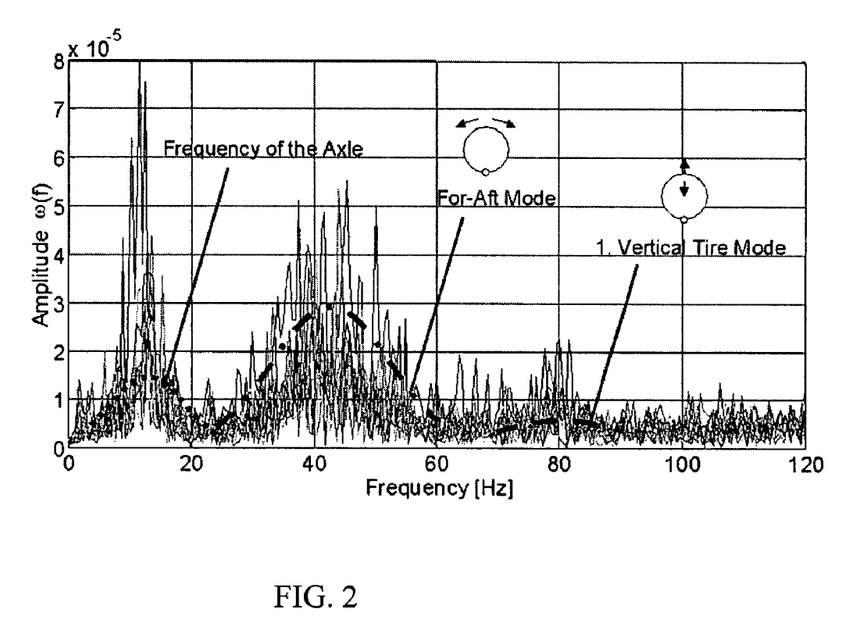
FIG. 2 depicts the frequency spectrum for for-aft torsional vibrations of an axle.

During the operation of a vehicle, for example, ground excitation generates torsional vibration or angular speed variations of one or more wheels or other powertrain components of the vehicle, such as the axles of the driven wheels. For example, in FIG. 2 illustrates the frequency spectrum of the vibration caused by such excitations as a vehicle moves along a straight line at speeds at or above 40 kph. As shown, the torsional vibration caused by for-aft excitation in the direction of travel of the vehicle is about 40 Hz. The frequency of the torsional vibration depends on the tire sidewall stiffness, which is mainly influenced by the tire pressure. The torsional vibration of a wheel shifts from a higher frequency to a lower frequency at a given speed when there is a pressure loss in a tire.

In accordance with various embodiments of the invention, a process or algorithm (see, e.g., FIG. 11 or 12) detects the tire air state based on the extracted natural frequency of the torsional vibration or angular speed variations of the wheel on which the tire is mounted. The process employs DFFT analysis for analyzing the torsional vibration. A DFFT analysis is disclosed in U.S. Pat. No. 6,374,163, the contents of which is incorporated herein in its entirety. Accordingly, in the present invention, vibration analysis through ABS wheel speed sensors enables detecting the torsional frequency shifting and hence tire pressure loss.

Figure 1:
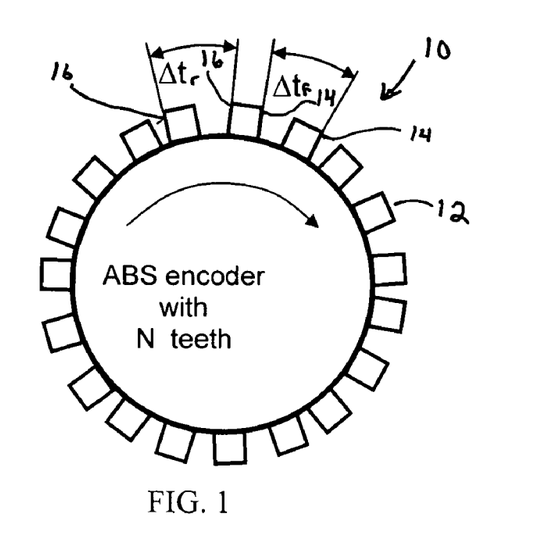
FIG. 1 illustrates an ABS encoder employed to monitor shifts in torsional vibration of an axle in accordance with an embodiment of the invention.

Referring now to FIG. 1, there is shown an ABS encoder 10 with N teeth 12, where during the rotation of the ABS encoder $\Delta t_f$ and $\Delta t_r$ represent the time period between two encoder flanks of rising edges 14 and down edges 16, respectfully. As the wheel rotates, appropriate software, implemented, for example, in an electronic control unit (ECU) of the vehicle, collects the number of tics passing one encoder flank (one tooth). Discontinuities in $\Delta t_f$ or $\Delta t_r$ signals may be caused by speed changes, production/mounting variations of encoder, and/or rough roads. The ABS encoder (or tone wheel) produces multiple peak outputs per wheel revolution and is typically based on variable reluctance or Hall effect devices. The ABS encoder is provided to accurately measure wheel speeds for use as inputs for variable anti-lock brakes (ABS), dynamic stability program (DSP) control (and other yaw stability and roll-over stability systems), and traction control systems (TCS).

A function is sampled at every spaced interval angle and the Fourier Transform is applied in the angular domain $s(\Omega)$, which is a function of the inverse angle $\theta$ (i.e., $\Omega=1/\theta$) expressed in cycles per $2\pi$ radian (i.e. cycles/$2\pi$), as given by the expression $$s(\Omega) = \int_{-\infty}^{\infty} r(\theta) e^{-j2\pi\Omega\theta} d\theta \quad (1)$$

The Fourier integral transforms can be rewritten for discrete sample data systems. In the angular domain, $\Theta$ is the sampling angle and N is the number of samples taken during a period of $\Theta$. In general, $\Theta$ is chosen as a multiple of $2\pi$ radian. Accordingly, the spectrum is given by the expression:

$$s(m\Delta\Omega) = \frac{\Theta}{N} \sum_{n=0}^{N-1} r(n\Delta\theta) e^{-j2\pi mn/N} \quad m = 0, 1, 2, \ldots, \frac{N}{2} \quad (2)$$

where the angle interval $\Delta\theta$ is considered a constant value, namely, $$\Delta\theta = \frac{2\pi}{\text{Number of Teeth } ABS \text{ encoder}} \quad (3)$$

and the rotation angle is $$\theta = n \Delta\theta \quad (4)$$

The angular frequency resolution is provided by the expression $$\Delta\Omega = \frac{2\pi}{\Theta} \text{ cycles}/2\pi \quad (5)$$

where the angular frequency $\Omega$ is represented as m $\Delta\Omega$. Accordingly, the Fourier integral transforms a discrete sampled angular domain to the angular frequency domain in units of cycles/$2\pi$.

The spaced interval in time $\Delta t_n$ represents a period of time during the $n_{th}$ rotation of $\Delta\theta$, and $\Delta t_n$ in general is not a constant because of the variations of the angular velocity of a given wheel.

If the sequence of sampled values is $$r(n\Delta\theta) = \Delta t_n \quad (6)$$

then from equation (2), the DFFT algorithm uses the following expression which applies equally to series of angles in real space:

$$s(m\Delta\Omega) = \frac{\Theta}{N} \sum_{n=0}^{N-1} \Delta t_n e^{-j2\pi mn/N} \quad m = 0, 1, 2, \ldots, \frac{N}{2} \quad (7)$$

Here, a contribution of spaced interval in time $\Delta t_n$ is $\Delta t_n e^{-j2\pi mn/N}$.

For the analysis of the torsional vibration, the sampling length N is calculated by the equation:

$$N = \frac{\Theta}{\Delta\theta} \quad (8)$$

A continuous contribution of each encoder flank $\Delta t_n$ (n=0,1,2,3, . . . , N−1) to all the predefined frequencies is $\Delta t_n \times e^{-j2\pi mn/N}$ M=0, 1, 2, . . . , M−1. Note that, in general, more than one encoder flank is rotated during a software loop, and all the contributions of these encoder flanks to the spectrum are completed within the same software loop.

In equation (2) the task of calculating the frequency spectrum is divided into N sub-tasks $\Delta t_n \times e^{-j2\pi mn/N}$ N=0, 1, 2, . . . , N−1. Hence, the total contribution for $\Delta t_n$ (n=0,1,2,3, . . . , N−1) creates a single angular frequency spectrum:

$$s(m\Delta\Omega) = \frac{\Theta}{N} \sum_{n=0}^{N-1} \Delta t_n \times e^{-j2\pi mn/N} \quad m = 1, 2, 3, \ldots, M-1$$

The total tics $$\sum_{n=0}^{N-1} \Delta t_n$$

are accumulated to calculate an angular velocity $\omega$.

Rewriting equation (7) in complex space, the frequency spectrum is given by:

$$s_r(m \Delta\Omega) = \frac{\Theta}{N}\left(\sum_{n=0}^{N-1} \Delta t_n \cos\left(\frac{2\pi mn}{N}\right) - j\sum_{n=0}^{N-1} \Delta t_n \sin\left(\frac{2\pi mn}{N}\right)\right) \quad (9)$$

$$m = 0, 1, 2, \ldots, \frac{N}{2}$$

and the amplitude of the angular frequency is:

$$|s_r(m\Delta\Omega)| = \frac{\Theta}{N}\sqrt{\left(\sum_{n=0}^{N-1}\Delta t_n \cos\left(\frac{2\pi mn}{N}\right)\right)^2 + \left(\sum_{n=0}^{N-1}\Delta t_n \sin\left(\frac{2\pi mn}{N}\right)\right)^2} \quad (10)$$

$$m = 0, 1, 2, \ldots, \frac{N}{2}$$

Note that the pitch of the teeth around the encoder tone wheel circumference is not constant because of variations in manufacturing tolerances, and therefore unbalanced variations for every revolution of tire occurs. Frequencies associated with these variations are referred to as pole pitch frequencies, and a pole pitch error is defined as the maximum tolerance on the teeth of the encoder tone wheel.

As the tire rotates, the pitch error will periodically create additional vibration in the frequency spectrum. These additional frequencies make it more difficult to find a peak torsional vibration in the angular domain. Therefore, in accordance with the invention, the pole pitch frequencies of the single spectrum are eliminated before proceeding with the detection algorithm or process.

Specifically, in the angular domain, pole pitch vibration occurs where the angular frequency $\Omega$ is equal to a multiple of cycles/$2\pi$ radian. Although there is no relation between pole pitch vibration and the vehicle speed in the angular domain, it is easier to eliminate pole pitch vibration in the angular domain than in the time domain because the vibration occurs at fixed angular frequencies in the angular domain.

Figure 3:
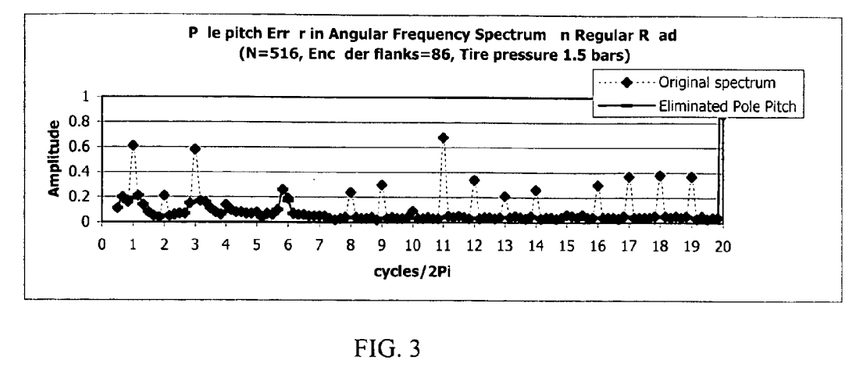
FIG. 3 depicts the distortion of a frequency spectrum caused by pole pitch errors.

FIG. 3 shows an angular frequency spectrum with and without pole pitch frequencies as a vehicle is driven on a regular road at the speed of about 80.0 kph, illustrating that pole pitch error distorts the frequency spectrum.

Although the spectrum in FIG. 3 is shown in the angular frequency domain, for vehicle vibration analysis, it is more convenient to express the amplitude of surface profiles in terms of the time frequency in Hz rather than in terms of the angular frequency in cycles/$2\pi$ radian since the vehicle vibration is a function of time. Hence, the angular frequency spectrum $\Omega$ in cycles/$2\pi$ is transferred to the time frequency spectrum in Hz with the following expression:

$$f \text{ Hz} = \Omega(\text{cycles}/2\pi \text{ radian}) \times \omega(2\pi \text{ radian/sec}) \quad (11)$$

where
$\Omega$—Angular frequency (cycles/$2\pi$ radian)
$\omega$—Angular velocity of a wheel ($2\pi$ radian/sec)

And the amplitude of the angular profile in terms of the angular frequency $A_\theta(\Omega)$ is transferred to the temporal frequency $A_t(f)$, according to the expression:

$$A_t(f) = \frac{A_\theta(\Omega)}{\omega} \quad (12)$$

where
$A_t$=amplitude of the temporal frequency spectrum, and
$A_\theta$=amplitude of the angular frequency spectrum.

Figure 4:
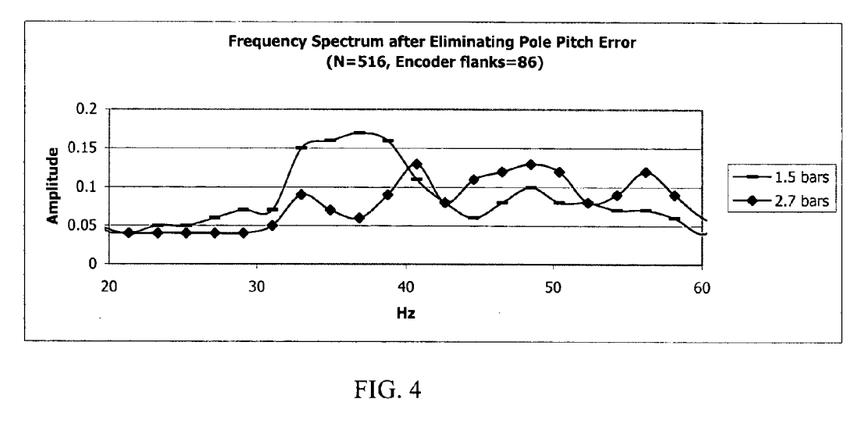
FIG. 4 depicts a frequency spectrum for a tire pressure loss of about 1.2 bars after eliminating the pole pitch error for a vehicle driven on a regular road.
Figure 5:
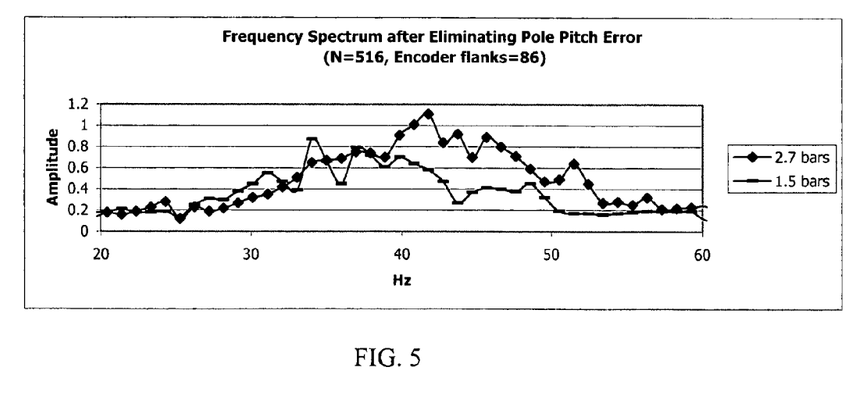
FIG. 5 depicts a frequency spectrum for a tire pressure loss of about 1.2 bars after eliminating the pole pitch error for a vehicle driven on a rough road.

FIG. 4 shows in the time frequency domain that after the pole pitch errors are eliminated, the peak for-aft torsional vibration shifts from 47.0 Hz to 35.0 Hz for a tire pressure loss of 1.2 bars for a vehicle driven over a regular road along a substantially straight line at a speed of about 80.0 kph. FIG. 5 shows the peak for-aft torsional vibration shifts from 42.0 Hz to 35.0 Hz for a tire pressure loss of 1.2 bar for a vehicle driven over a rough road at a speed of about 40 kph.

As can be seen FIGS. 4 and 5, even after eliminating pole pitch error, a single frequency spectrum still includes noise or deviation. Therefore, to eliminate deviation of the single spectrum, an averaging spectrum $s_p(m\Delta\Omega)$ is introduced by combining the continuous K single spectra according to the expression:

$$s_p(m\Delta\Omega) = \sum_{k=0}^{K-1} s_k(m\Delta\Omega) \quad m = 1, 2, 3, \ldots, M-1 \quad (13)$$

Curve-fitting is then applied to the series of averaged frequency spectra. Specifically, a peak torsional vibration frequency $F_0$ (cycles/$2\pi$) in the angular domain is curve fitted according to the expression:

$$F_0 = -\frac{\Delta_b}{2 \times \Delta_a} \quad (14)$$

where, $$\Delta_a = \begin{vmatrix} \sum_{m=M_1}^{M_2-1} x_m^2 y_m & \sum_{m=M_1}^{M_2-1} x_m^3 & \sum_{m=M_1}^{M_2-1} x_m^2 \\ \sum_{m=M_1}^{M_2-1} x_m y_m & \sum_{m=M_1}^{M_2-1} x_m^2 & \sum_{m=M_1}^{M_2-1} x_m \\ \sum_{m=M_1}^{M_2-1} y_m & \sum_{m=M_1}^{M_2-1} x_m & M_2 - M_1 \end{vmatrix} \quad (15a)$$

$$\Delta_b = \begin{vmatrix} \sum_{m=M_1}^{M_2-1} x_m^4 & \sum_{m=M_1}^{M_2-1} x_m^2 y_m & \sum_{m=M_1}^{M_2-1} x_m^2 \\ \sum_{m=M_1}^{M_2-1} x_m^3 & \sum_{m=M_1}^{M_2-1} x_m y_m & \sum_{m=M_1}^{M_2-1} x_m \\ \sum_{m=M_1}^{M_2-1} x_m^2 & \sum_{m=M_1}^{M_2-1} y_m & M_2 - M_1 \end{vmatrix} \quad (15b)$$

and $x_m = m\Delta\Omega$ $y_m = S_p(m\Delta\Omega) \quad m = M_1, M_1+1, \ldots, M_2-1 \quad (16)$ The range of the curve-fitting is determined by the values of $M_1$ and $M_2$, which are functions of the angular velocity $\omega$.

A 'BAD' spectrum is rejected if the fitted curve regresses to a straight line (i.e., if $\Delta_a \cong 0$), if the peak position is out of the pre-defined range, or if the calculation overflows.

As mentioned above, it is more convenient to characterize vehicle vibrations in the time frequency domain rather than in the angular frequency domain. Therefore, after calculating the peak torsional vibration from the frequency spectrum, the process maps the peak torsional vibration from angular domain to the time domain. That is, the process continues to calculate a series of frequency observations and determines an initial torsional frequency ($f_0$) in the time frequency domain based on the observations. Specifically, the peak torsional vibration is mapped to the frequency domain (Hz) according to:

$$f_0 = F_0 \times \omega_0 \quad (17a)$$

For example, assuming $\Theta=2\pi\times I$ and the tic time is $\mu=4\times10^{-6}$ sec, then the angular velocity is $$\omega_0 = \frac{1}{\left(\sum_{n=0}^{N-1} \Delta t_n\right)/I \times 4 \times 10^{-6}} (2\pi/\text{sec}) \quad (17b)$$

where I is a predefined number of sampling cycles.

Figure 6:
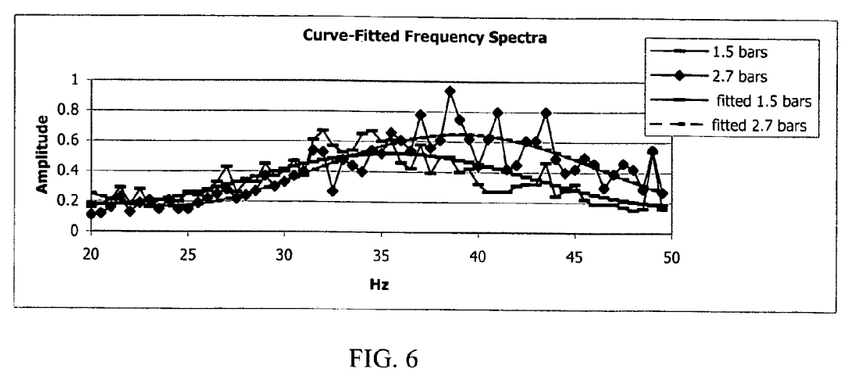
FIG. 6 depicts frequency spectrum of data for 1.5 bars and 2.7 bars and respective curve fitted results.

FIG. 6 illustrates the results of curve-fitting applied to the frequency spectrum generated for a vehicle driven over a rough road at the speed of about 60.0 kph after mapping to the time frequency domain. As shown, the peak frequency shifts from 40.0 Hz to 35.0 Hz during a tire pressure loss from 2.7 bars to 1.5 bars.

After calculating the initial frequency, the process makes adjustments to the frequency over time. Even if the vehicle changes speed, the process continues to calculate the single spectrum, the averaging spectrum, and the peak of angular frequency in the angular domain and maps the peak $F_i$ in the angular domain to the time domain $f_i (i=1,2,3, \ldots)$ by the aforementioned process, that is, $$f_i = F_i \times \omega_i, \quad i=1,2,3, \ldots, I, \quad (18)$$

A filtering calculation is also applied to the series of observed values. Moreover, when i reaches the predefined value I, the process outputs and continues to update the peak frequency of the torsional vibration in real time.

The aforementioned process is able to detect pressure losses in more than one tire, since, for example, tire pressure loss in the front left tire causes vibration shifting in that tire but does not impact the performance of the front right tire and vice versa. Similarly, vibration of the rear left tire is isolated from the vibration of the rear right tire and vice versa.

Figure 7:
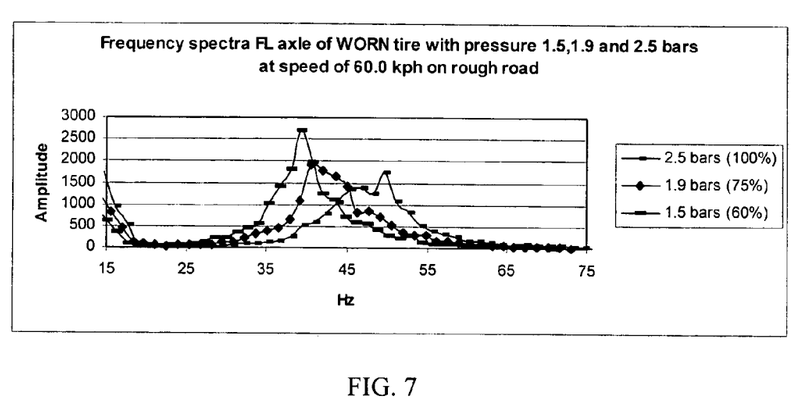
FIG. 7 depicts the frequency spectra of a front left tire for various pressure losses.
Figure 8:
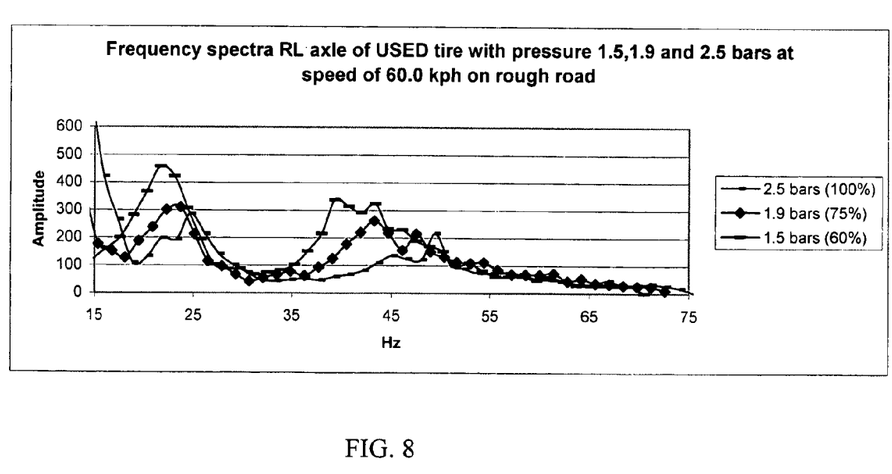
FIG. 8 depicts the frequency spectra of a right left tire for various pressure losses.

As an example, the process was implemented in a front-wheel drive vehicle driven on a rough road at about 60 kph, in which the tire pressure of the front right tire was 2.3 bars and that of the rear right tire was 2.1 bars. The tire pressure of the front left and rear left tires were changed to 1.5 bars, 1.9 bars, and 2.5 bars. As shown in FIG. 7, pressure loss in the front left tire caused the peak for-aft vibration to shift from 47.3 Hz to 40.9 Hz. As shown in FIG. 8, pressure loss in the rear left tire shifted the peak for-aft vibration from 47.0 Hz to 43.8 Hz.

Note also in FIGS. 7 and 8 that the amplitude of the peak vibration associated with the rear left tire is less than that of the front left tire. This is expected, since in a front wheel drive vehicle torsional compliance is provided by the front wheel axles and other powertrain components. The non-driven rear wheels, on the other hand, have very little connected components and therefore there is no significant coupled torsional compliance associated with the rear wheels.

Figure 9:
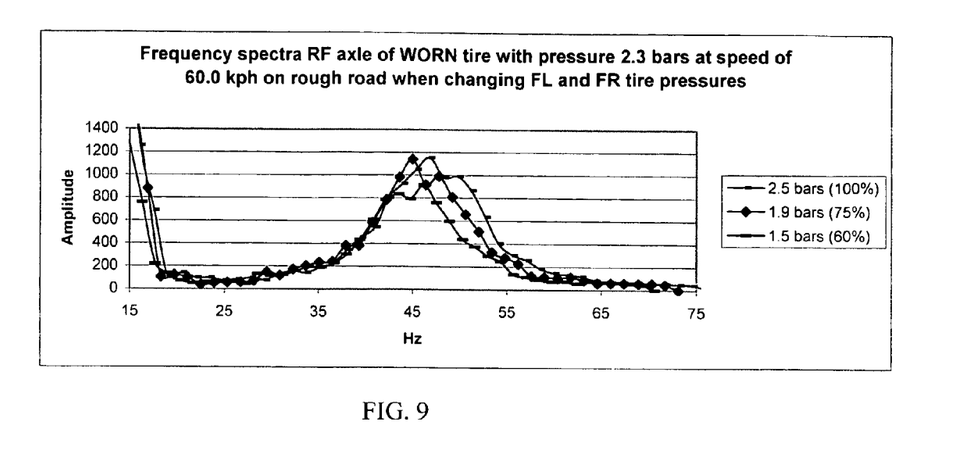
FIG. 9 depicts the frequency spectra of a front right tire for various pressure losses.
Figure 10:
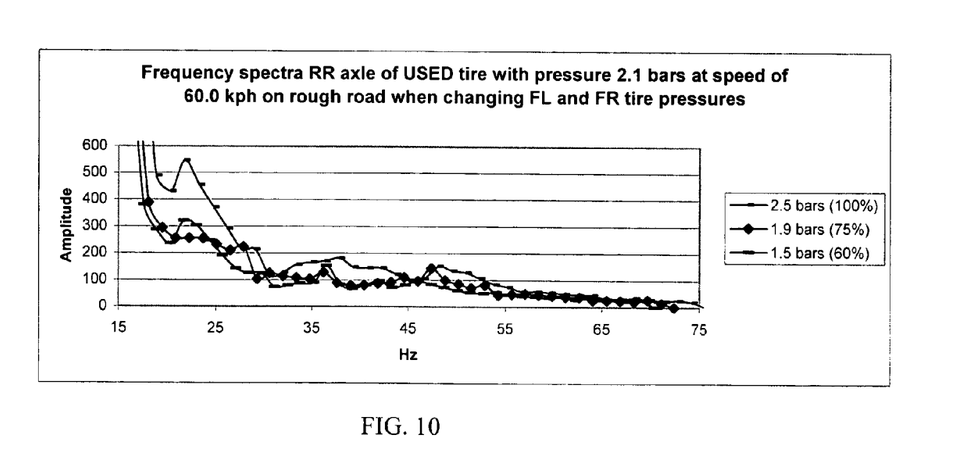
FIG. 10 depicts the frequency spectra of a rear right tire for various pressure losses.

FIG. 9 illustrates that there is no significant shift in the peak for-aft vibration associated with the front right tire. That is, the front left axle vibration does not impact the performance of the front right axle. Similarly, FIG. 10 shows that there is no significant shift for the rear right tire.

Figure 11:
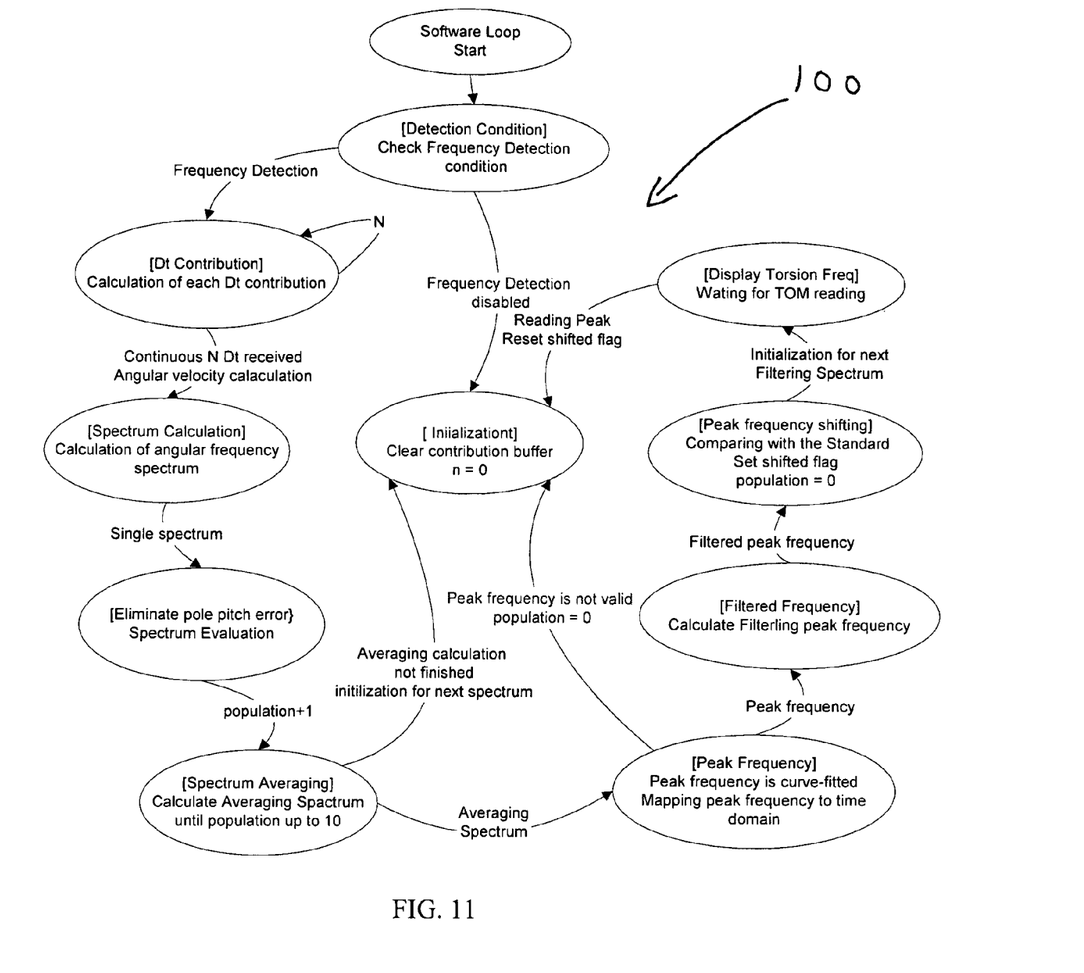
FIG. 11 depicts a state diagram for torsional vibration detection in accordance with an embodiment of the invention.
Figure 12:
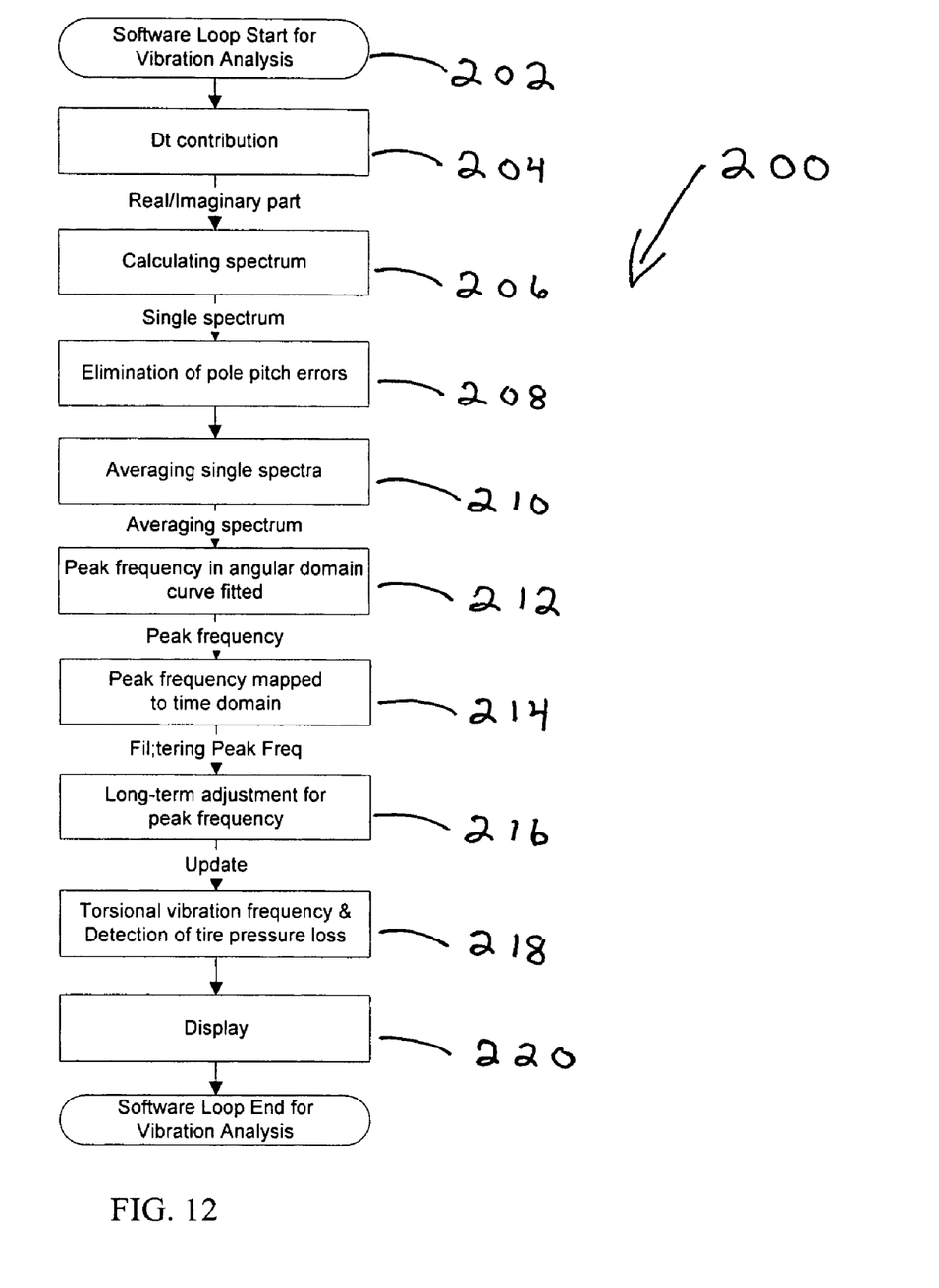
FIG. 12 depicts a flow diagram of a sequence of steps for the torsional vibration detection in accordance with an embodiment of the invention.

The above described process is illustrated in FIG. 11 as a state diagram 100 and in FIG. 12 as a flow diagram of a process of steps 200. Referring in particular to FIG. 12, after initiating in step 202, the process 200 determines the discrete (Dt) contribution in step 204 from which the real and imaginary components are obtained to calculate the spectrum in step 206.

In step 208, after creating the single spectrum, the process 200 eliminates the pole pitch error and in step 210 combines the continuous single spectra to an averaging spectrum in the angular domain. In step 212, the process 200 curve fits the averaged spectrum and maps the peak frequency of the curve-fitted spectrum from the angular domain to the time domain in step 214. Subsequently, the process 200 filters the peak frequency and makes long-term adjustments to the peak frequency over time in step 216. As mentioned above, the process 200 continues to calculate the torsional vibration frequency, even when the vehicle speed changes, and applies statistical analysis to the series of observed data to extract the best value of the estimated frequency. This update is used to detect the shift in the torsional vibration frequency, which is related to the tire pressure loss of one or more tires in step 218. The results are displayed in step 220, and the analysis subsequently ends.

Other embodiments are within the scope of the following claims.

What is claimed is:

1. A method of detecting the tire pressure loss in a vehicle, comprising:
    detecting torsional vibrations of one or more wheels of the vehicle to produce an angular frequency spectrum in an angular frequency domain;
    eliminating pole pitch errors in the angular frequency spectrum;
    mapping a peak frequency from the angular frequency spectrum in the angular frequency domain to a time frequency domain;
    determining if the peak frequency in the time frequency domain changes over time;
    relating frequency changes to pressure loss in one or more tires associated with the one or more wheels; and
    indicating the pressure loss to the driver of the vehicle.

2. The method of claim 1 wherein the determining includes determining if the frequency shifts from a higher frequency to a lower frequency at a given vehicle speed.

3. The method of claim 1 wherein the detecting includes detecting the vibration with an ABS encoder.

4. The method of claim 1 further comprising averaging a series of continuous single angular frequency spectra.

5. The method of claim 4 further comprising curve filling the averaged frequency spectrum in the angular frequency domain.

6. The method of claim 5 further comprising calculating the peak frequency from the averaged frequency spectrum.

7. The method of claim 6 further comprising making long-term adjustments by filtering a series of peak frequencies.

8. The method of claim 1 wherein the determining includes detecting shifts in the peak frequency.

9. The method of claim 8 wherein the indicating includes presenting tire pressure loss information on a display viewed by the driver of the vehicle.

10. The method of claim 1 further comprising employing Fast Fourier Transforms for transforming a discrete sampled angular domain to an angular frequency domain.

11. The method of claim 10 further comprising employing Discrete Fast Fourier Transforms.

12. The method of claim 1 wherein the detecting includes detecting torsional vibrations of four wheels.

13. The method of claim 12 wherein the indicating includes indicating pressure loss in one or more tires of four tires mounted on the respective wheels.

14. The method of claim 1 wherein the detecting occurs at vehicle speeds of at least 40 kph.

* * * * *